(12) United States Patent
Pinskiy et al.

(10) Patent No.: US 9,799,146 B2
(45) Date of Patent: Oct. 24, 2017

(54) OBJECT DEFORMATION MODELING

(71) Applicant: Disney Enterprises, Inc., Burbank, CA (US)

(72) Inventors: Dmitriy Pinskiy, Encino, CA (US); Jose Luis Gomez Diaz, Los Angeles, CA (US); Nara Yun, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 266 days.

(21) Appl. No.: 14/795,591

(22) Filed: Jul. 9, 2015

(65) Prior Publication Data

US 2017/0011549 A1    Jan. 12, 2017

(51) Int. Cl.
*G06T 17/00*    (2006.01)
*G06T 19/20*    (2011.01)

(52) U.S. Cl.
CPC .......... *G06T 19/20* (2013.01); *G06T 2200/24* (2013.01); *G06T 2210/21* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 7,812,850 B1 * | 10/2010 | Nelson | G06T 19/20 345/420 |
| 2009/0251462 A1 | 10/2009 | Kaytis | |
| 2011/0246329 A1 * | 10/2011 | Geisner | G06F 3/017 705/27.1 |

OTHER PUBLICATIONS

Fisher et al. (Fast Penetration Depth Estimation for Elastic Bodies Using Deformed Distance Fields, IEEE, 2001).*
Teschner et al. (Collision Detection for Deformable Objects, Computer Graphics Forum, Wiley, 2005).*

* cited by examiner

*Primary Examiner* — Kyle Zhai
(74) *Attorney, Agent, or Firm* — Farjami & Farjami LLP

(57) ABSTRACT

There are provided systems and methods for performing object deformation modeling. One example system includes a hardware processor, a system memory, and a contact-based deformation modeling software stored in the system memory. The hardware processor is configured to execute the contact-based deformation modeling software to receive a first object geometric data corresponding to a first virtual object and a second object geometric data corresponding to at least a second virtual object, and to transform the first object geometric data by an n-dimensional mapping onto an object deformation space determined based on n primitive deformations. The hardware processor is also configured to execute the contact-based deformation modeling software to model a deformation of the first virtual object due to contact with at least the second virtual object, based on the n-dimensional mapping and a definition of direction for an object-to-object contact force.

15 Claims, 6 Drawing Sheets

OBJECT DEFORMATION MODELING

BACKGROUND

Computer rendered graphics have come to play an important role in the production of a variety of entertainment content types. For example computer rendered graphics are regularly used in the creation of feature films and animation. One aspect of computer graphics rendering that has remained challenging is the representation of deformations of virtual objects due to their interactions. For, example a scene may include a soft object involved in a collision with a hard object and temporarily deformed as a result of contact. One conventional approach to modeling such object deformations includes performing a rigorous mathematical simulation of the objects' interaction and its results. However, due to the high processing overhead imposed by such a solution, the time required for its calculation, and the level of mathematical sophistication required to implement it, this conventional approach is impractical for use by most artists. Nevertheless, as computer rendered graphics continue to be adopted for use across an increasingly broad spectrum of entertainment content types, artistic control of object deformation within a scene, whether for the purposes of enhancing realism, or to creatively alter reality for artistic effect, becomes increasingly important.

SUMMARY

There are provided systems and methods for object deformation modeling, substantially as shown in and/or described in connection with at least one of the figures, and as set forth more completely in the claims.

DETAILED DESCRIPTION

Figure 1:
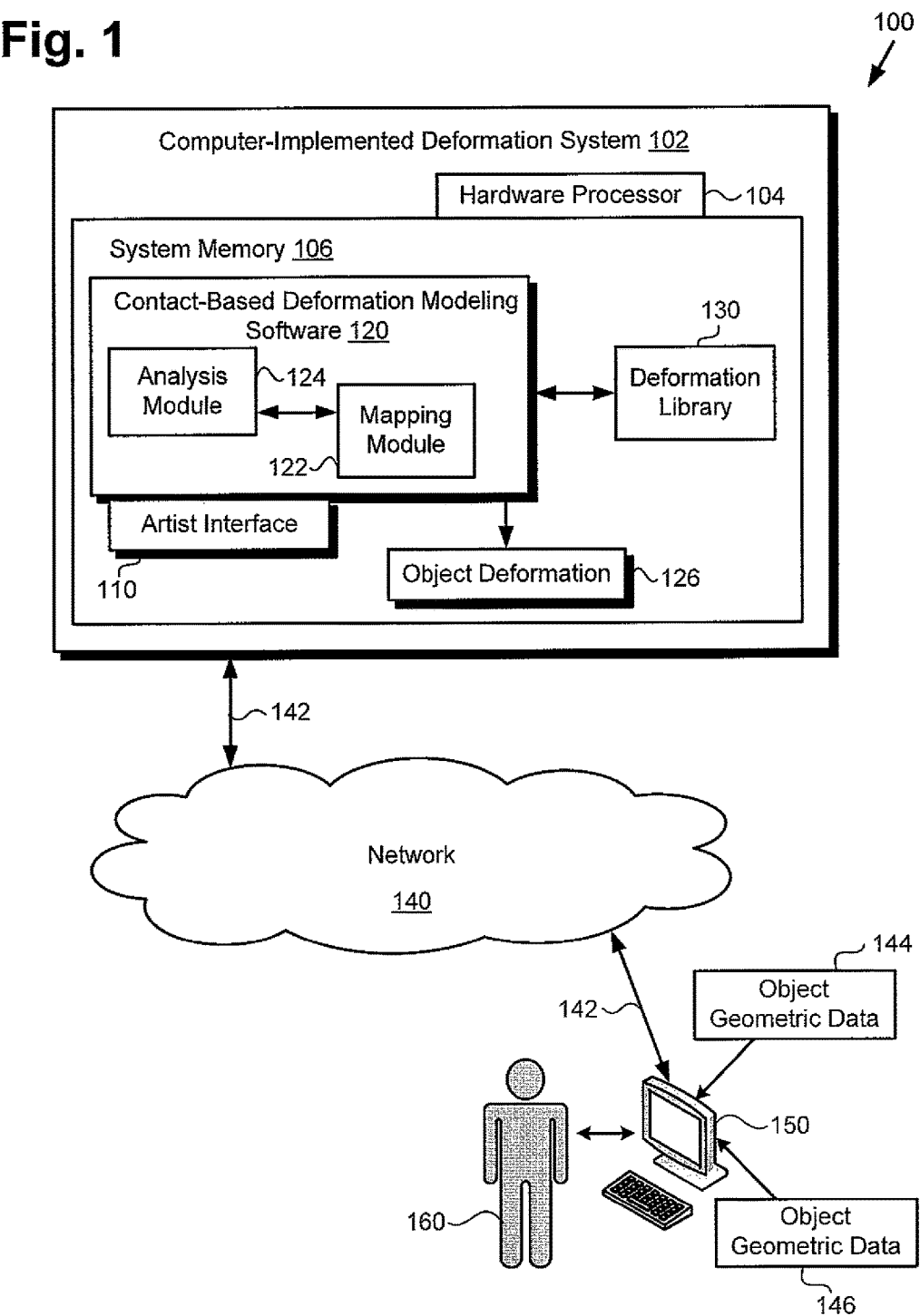
FIG. 1 shows a diagram of an exemplary system configured to perform object deformation modeling, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system configured to perform object deformation modeling according to one implementation. As shown in FIG. 1, computer-implemented deformation system 102 is situated within computing environment 100 including communication network 140, client system 150, and a user, such as an artist (hereinafter "system user 160").

Computer-implemented deformation system 102 includes hardware processor 104, and system memory 106 storing artist interface 110, as well as contact-based deformation modeling software 120 including mapping module 122 and analysis module 124. In addition, system memory 106 is shown to include deformation library 130 and object deformation 126 modeled using contact-based deformation modeling software 120. Also shown in FIG. 1 are network communication links 142 interactively connecting client system 150 and computer-implemented deformation system 102 via communication network 140, as well as first object geometric data 144 and second object geometric data 146 on client system 150.

According to the implementation shown in FIG. 1, system user 160 may utilize client system 150 to interact with computer-implemented deformation system 102 over communication network 140. For example, system user may utilize client system 150 and communication network 140 to access artist interface 110, contact-based deformation modeling software 120, and deformation library 130 remotely or to download artist interface 110 and/or contact-based deformation modeling software 120 and/or deformation library 130 to client system 150. In one implementation, computer-implemented deformation system 102 may correspond to one or more web servers, accessible over a packet network such as the Internet, for example. Alternatively, computer-implemented deformation system 102 may correspond to one or more servers supporting a local area network (LAN), or included in another type of limited distribution network.

It is noted that although FIG. 1 depicts artist interface 110, contact-based deformation modeling software 120, and deformation library 130 as being mutually co-located in system memory 106, such a representation is merely provided as an aid to conceptual clarity. More generally, computer-implemented deformation system 102 may include one or more servers, as noted above, which may be co-located, or may form an interactively linked but distributed system. As a result, hardware processor 104 and system memory 106 may correspond to distributed processor and memory resources within computer-implemented deformation system 102. Thus, it is to be understood that artist interface 110, contact-based deformation modeling software 120, and deformation library 130 may be stored remotely from one another within the distributed memory resources of computer-implemented deformation system 102, which may be a cloud based system, for example.

Hardware processor 104 is configured to execute contact-based deformation modeling software 120 to receive first object geometric data 144 corresponding to a first virtual object via client system 150, communication network 140, and artist interface 110. Hardware processor 104 is also configured to execute contact-based deformation modeling software 120 to receive second object geometric data 146 corresponding to a second virtual object via client system 150, communication network 140, and artist interface 110. Hardware processor 104 is further configured to execute contact-based deformation modeling software 120 to use mapping module 122 to transform first object geometric data 144 by an n-dimensional mapping onto an object deformation space.

As described in greater detail below, the n-dimensional object deformation space utilized by mapping module 122 is determined based on n primitive deformations. Those primitive deformations may be obtained by contact-based deformation modeling software 120 from deformation library 130. Hardware processor 104 is also configured to execute contact-based deformation modeling software 120 to use analysis module 124 to model object deformation 126 of the first virtual object due to contact with the second virtual object, based on the n-dimensional mapping and a definition of direction for an object-to-object contact force between the first virtual object and the second virtual object.

It is noted that, in some implementations, the first virtual object may be in motion. In those implementations, first object geometric data 144 includes data corresponding to at least a front surface of the first virtual object with respect to the first virtual object's direction of motion, as well as other data corresponding to a back surface of the first virtual object with respect to the direction of motion. Moreover, in those implementations, hardware processor 104 may be configured to execute contact-based deformation modeling software 120 to receive first object geometric data 144 including data corresponding to the front surface and data corresponding to the back surface of the first virtual object, as well as second object geometric data 146, via client system 150, communication network 140, and artist interface 110.

Hardware processor 104 may then be configured to use mapping module 122 to transform the object geometric front surface data included in first object geometric data 144 by the n-dimensional mapping onto the object deformation space noted above, and to use mapping module 122 to transform the object geometric back surface data included in first object geometric data 144 by an m-dimensional mapping onto another object deformation space, where in is another number of primitive deformations, and where in is an integer larger than one. Depending on the specific details of the use case involved, n may or may not be equal to m. Hardware processor 104 may be further configured to execute contact-based deformation modeling software 120 to use analysis module 124 to model object deformation 126 of the first virtual object due to the contact with the second virtual object, based on the n-dimensional mapping, the definition of direction for the object-to-object contact force between the first virtual object and the second virtual object, and the m-dimensional mapping.

In addition, in some implementations, artist interface 110 may be configured to receive an input from system user 160 for determining the n-dimensional mapping and/or the m-dimensional mapping. In those implementations, hardware processor 104 may be further configured to execute contact-based deformation modeling software 120 to perform the n-dimensional mapping and/or the m-dimensional mapping based on the input received from system user 160.

It is noted that although FIG. 1 depicts object deformation 126 as residing in system memory 106, in some implementations, object deformation 126 may be copied to non-volatile storage (not shown in FIG. 1), or may be transmitted to client system 150 via communication network 140. It is further noted that although client system 150 is shown as a personal computer (PC) in FIG. 1, that representation is provided merely as an example. In other implementations, client system 150 may be a substantially stationary computing resource, such as a computer equipped kiosk or computer workstation, for example, or may be a portable communication device, such as a PC, smartphone, or tablet computer, for example.

It is further noted that, although the present exemplary use case is described in terms of a first virtual object and a second virtual object, in other implementations, the first virtual object may make contact or otherwise interact with more than one other virtual object. Thus any description herein referring to "a second virtual object" and "the second virtual object" is to be interpreted as referring more generally to "at least a second virtual object" and "the at least second virtual object."

In one implementation, computer-implemented deformation system 102 for performing object deformation modeling includes hardware processor 104 and system memory 106 storing contact-based deformation modeling software 120 and artist interface 110. Contact-based deformation modeling software 120 includes mapping module 122 and analysis module 124. Contact-based deformation modeling software 120 is configured to receive first object geometric data 144 and second object geometric data 146, and to use mapping module 122 to transform first object geometric data 144 and by an n-dimensional mapping onto an object deformation space determined based on n primitive deformations. Contact-based deformation modeling software 120 is also configured to use analysis module 124 to model a deformation of the first virtual object due to contact with the second virtual object, based on the n-dimensional mapping and the definition of direction for the object-to-object contact force between the first virtual object and the second virtual object. According to one implementation, such a system may be utilized by a user lacking expertise in computational mathematics, such as an artist, to model object deformations in an intuitive fashion, substantially in real-time.

Figure 2:
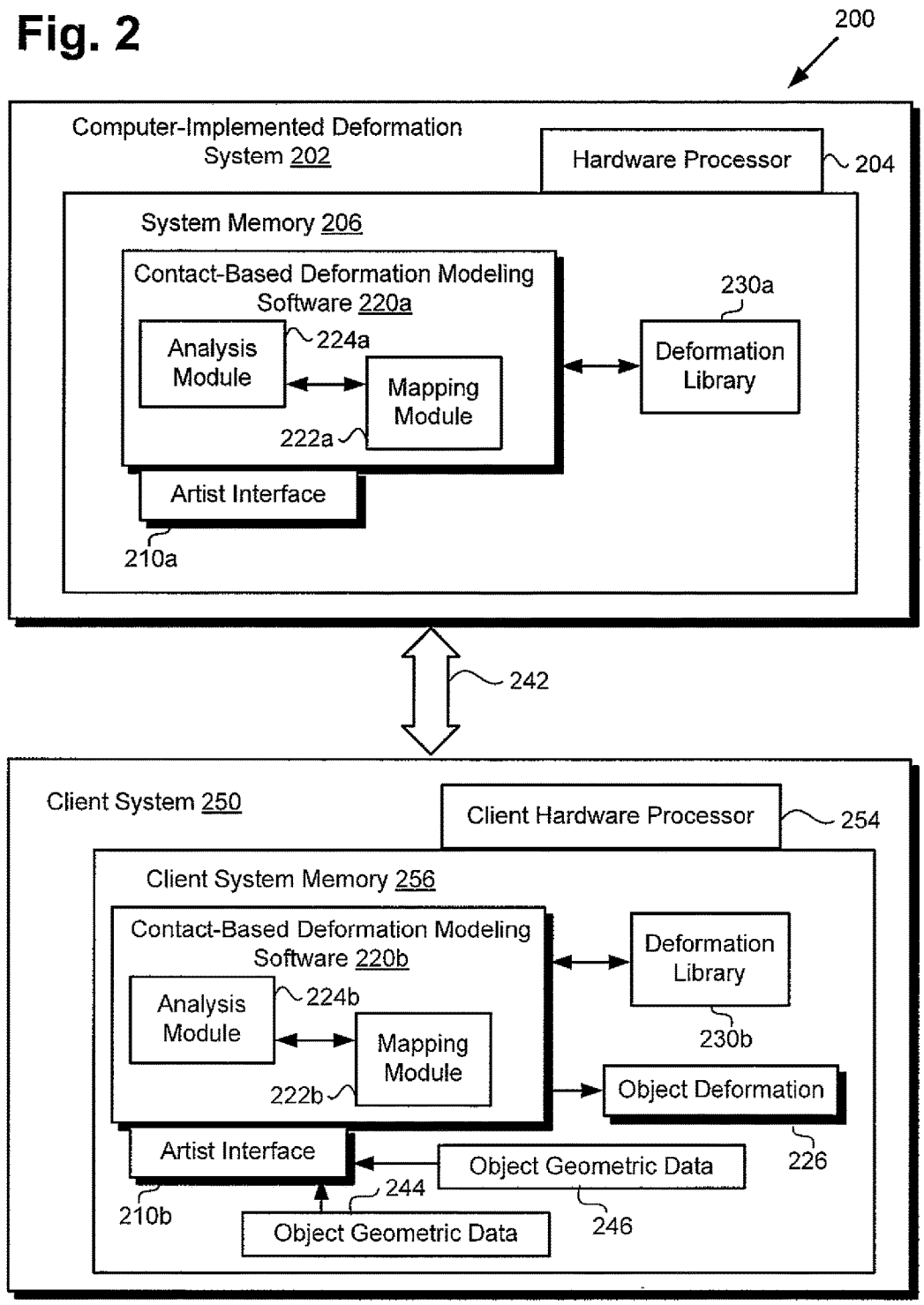
FIG. 2 shows another exemplary implementation of a system configured to perform object deformation modeling.

Referring to FIG. 2, FIG. 2 shows a more detailed exemplary implementation of client system 250, which may itself be configured to perform object deformation modeling. Computing environment 200 in FIG. 2 includes client system 250 interactively connected to computer-implemented deformation system 202 over network communication link 242. As shown in FIG. 2, computer-implemented deformation system 202 includes hardware processor 204, and system memory 206 storing artist interface 210a, contact-based deformation modeling software 220a including mapping module 222a and analysis module 224a, and deformation library 230a. As further shown in FIG. 2, client system 250 includes client hardware processor 254, and client system memory 256 storing artist interface 210b, contact-based deformation modeling software 220b including mapping module 222b and analysis module 224b, and deformation library 230b. Also shown in FIG. 2 are first object geometric data 244, second object geometric data 246, and object deformation 226 modeled by contact-based deformation modeling software 220b on client system 250.

Network communication link 242, and computer-implemented deformation system 202 including hardware processor 204 and system memory 206, correspond in general to network communication links 142, and computer-implemented deformation system 102 including hardware processor 104 and system memory 106, in FIG. 1. In addition, artist interface 210a, contact-based deformation modeling software 220a including mapping module 222a and analysis module 224a, and deformation library 230a, in FIG. 2, correspond respectively to artist interface 110, contact-based deformation modeling software 120 including mapping module 122 and analysis module 124, and deformation library 130 in FIG. 1. In other words, artist interface 210a, contact-based deformation modeling software 220a including mapping module 222a and analysis module 224a, and deformation library 230a may share any of the characteristics attributed to corresponding artist interface 110, contact-based deformation modeling software 120 including mapping module 122 and analysis module 124, and deformation library 130 shown in FIG. 1 and described above.

Client system 250 corresponds in general to client system 150, in FIG. 1. Moreover, artist interface 210b, contact-based deformation modeling software 220b including mapping module 222b and analysis module 224b, and deformation library 230b correspond respectively to artist interface 110/210a, contact-based deformation modeling software 120/220b including mapping module 122/222b and analysis module 124/224b, and deformation library 130/230a. As a result, artist interface 210b, contact-based deformation modeling software 220b including mapping module 222b and analysis module 224b, and deformation library 230b may share any of the characteristics attributed to corresponding artist interface 110, contact-based deformation modeling software 120 including mapping module 122 and analysis module 124, and deformation library 130 shown in FIG. 1 and described above.

According to the exemplary implementation shown in FIG. 2, artist interface 210b, contact-based deformation modeling software 220b including mapping module 222b and analysis module 224b, and deformation library 230b are located in client system memory 256, having been received from computer-implemented deformation system 202 via network communication link 242. In one implementation, network communication link 242 corresponds to transfer of artist interface 210b, contact-based deformation modeling software 220b including mapping module 222b and analysis module 224b, and deformation library 230b over a packet network, for example. Once transferred, for instance by being downloaded over network communication link 242, artist interface 210b, contact-based deformation modeling software 220b including mapping module 222b and analysis module 224b, and deformation library 230b may be persistently stored in client system memory 256 and may be executed locally on client system 250 by client hardware processor 254.

Client hardware processor 254 may be the central processing unit (CPU) for client system 250, for example, in which role client hardware processor 254 runs the operating system for client system 250 and executes artist interface 210b, contact-based deformation modeling software 220b including mapping module 222b and analysis module 224b, and deformation library 230b. In the exemplary implementation of FIG. 2, a user of client system 250, such as system user 160, in FIG. 1, can utilize artist interface 210b, contact-based deformation modeling software 220b including mapping module 222b and analysis module 224b, and deformation library 230b to model object deformation 226, which corresponds to object deformation 126. It is noted that first object geometric data 244 and second object geometric data 246, in FIG. 2, correspond respectively to first object geometric data 144 and second object geometric data 146, in FIG. 1, and may share any of the characteristics attributed to those corresponding features, above.

Figure 3:
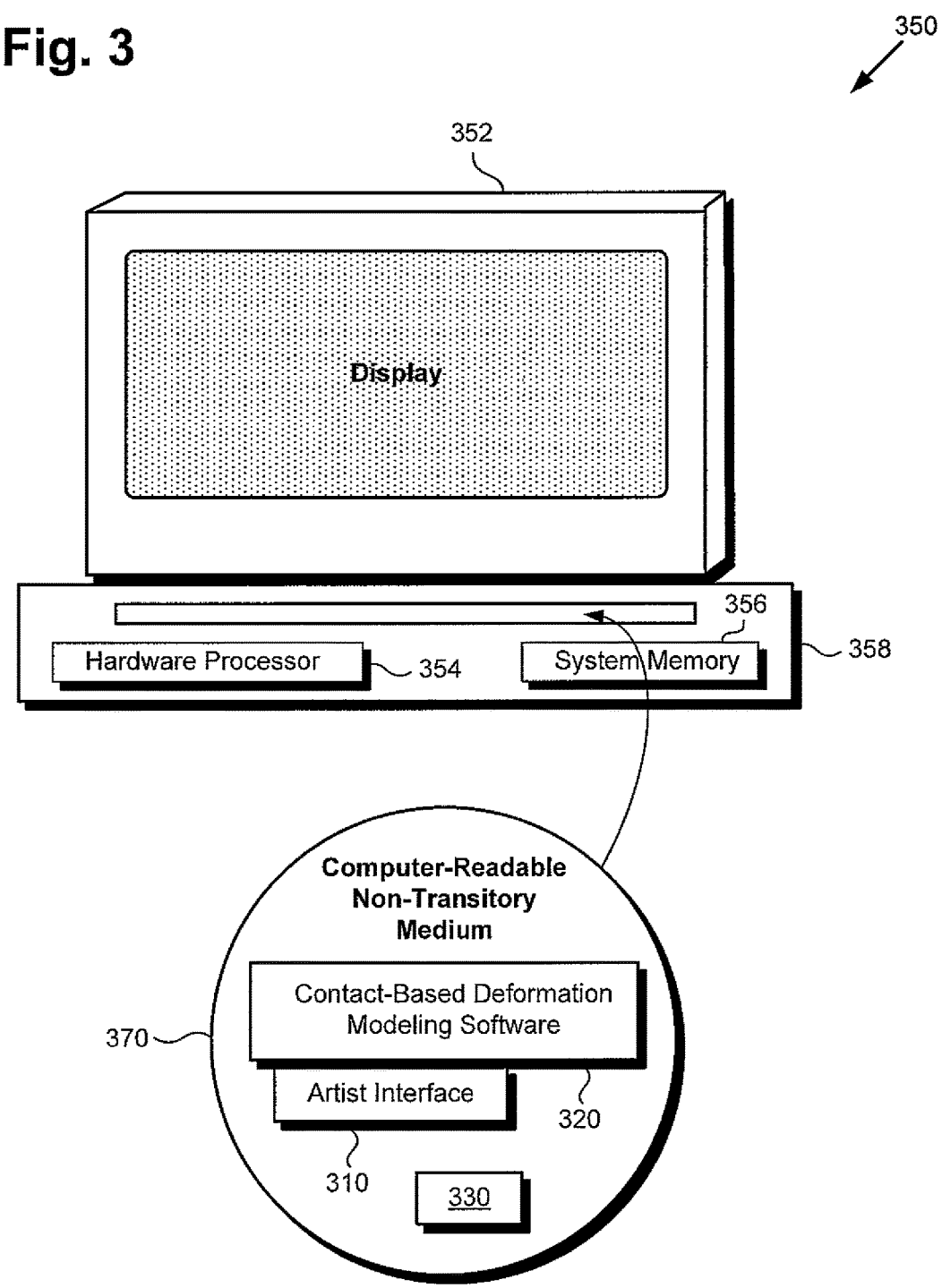
FIG. 3 shows an exemplary system and a computer-readable non-transitory medium including instructions for performing object deformation modeling.

Moving now to FIG. 3, FIG. 3 shows an exemplary system and a computer-readable non-transitory medium including instructions for performing object deformation modeling, according to one implementation. As shown in FIG. 3, system 350 includes computer 358 having hardware processor 354 and system memory 356, interactively linked to display 352. Display 352 may take the form of a liquid crystal display (LCD), a light-emitting diode (LED) display, an organic light-emitting diode (OLED) display, or another suitable display screen that performs a physical transformation of signals to light. System 350 including hardware processor 354 and system memory 356 corresponds in general to any or all of computer-implemented deformation system 102 and client system 150, in FIG. 1, and computer-implemented deformation system 202 and client system 250, in FIG. 2.

Also shown in FIG. 3 is computer-readable non-transitory medium 370 having artist interface 310 and contact-based deformation modeling software 320 stored thereon. In addition, in some implementations, as shown in FIG. 3, computer-readable non-transitory medium 370 may optionally also include deformation library 330. The expression "computer-readable non-transitory medium," as used in the present application, refers to any medium, excluding a carrier wave or other transitory signal, that provides instructions to hardware processor 354 of computer 358. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 370 provides artist interface 310, contact-based deformation modeling software 320, and deformation library 330 for execution by hardware processor 354 of computer 358. Artist interface 310, contact-based deformation modeling software 320, and deformation library 330, when executed by hardware processor 354, instantiate an artist interface, contact-based deformation modeling software, and deformation library corresponding respectively to artist interface 110/210a/210b, contact-based deformation modeling software 120/220a/220b, and deformation library 130/230a/230b in FIG. 1/2, and capable of performing all of the operations attributed to those corresponding features by the present disclosure.

Figure 4:
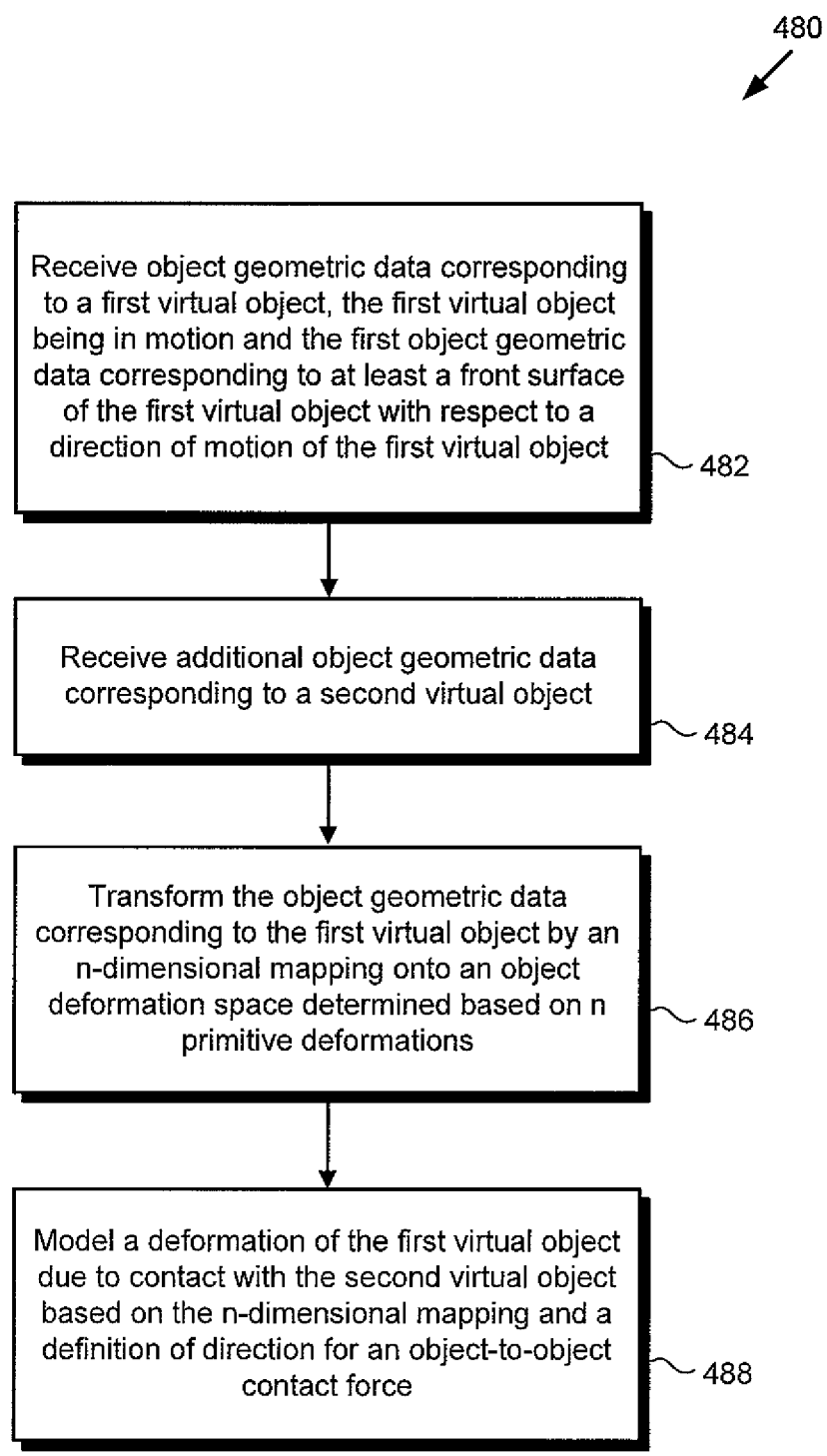
FIG. 4 is a flowchart presenting an exemplary method for performing object deformation modeling, according to one implementation.

The systems configured to perform object deformation modeling and discussed above by reference to FIGS. 1, 2, and 3, will be further described below with reference to FIG. 4. FIG. 4 presents flowchart 400 outlining an exemplary method for performing object deformation modeling.

Flowchart 400 begins with receiving first object geometric data 144/244 corresponding to a first virtual object (action 482). First object geometric data 144/244 may be received by contact-based deformation modeling software 120/220a/220b/320 of system 102/202/250/350, executed by respective hardware processor 104/204/254/354. As shown in FIG. 1, first object geometric data 144/244 may be received by contact-based deformation modeling software 120/220a/220b/320 from client system 150, via communication network 140 and artist interface 110.

First object geometric data 144/244 may correspond to the surface of the first virtual object, and may describe the shape of the first virtual object, for example. As noted above, in some implementations, the first virtual object may be in motion, and first object geometric data 144/244 may include data corresponding to a front surface of the first virtual object with respect to a direction of motion of the first virtual object. In those implementations, first object geometric data 144/244 may also include other data corresponding to a back surface of the first virtual object with respect to its direction of motion.

Flowchart 400 continues with receiving second object geometric data 146/246 corresponding to a second virtual object (action 484). Second object geometric data 146/246 may be received by contact-based deformation modeling software 120/220a/220b/320 of system 102/202/250/350, executed by respective hardware processor 104/204/254/354. As shown in FIG. 1, second object geometric data 146/246 may be received by contact-based deformation modeling software 120/220a/220b/320 from client system 150, via communication network 140 and artist interface 110.

Flowchart 400 continues with transforming first object geometric data 144/244 by an n-dimensional mapping onto an object deformation space determined based on n primitive deformations (action 486). That is to say, the object deformation space is an n-dimensional space determined based on n primitive deformations, where n is an integer larger than one (1). First object geometric data 144/244 may be transformed using contact-based deformation modeling software 120/220a/220b/320 of system 102/202/250/350, using mapping module 122/222a/222b, and executed by hardware processor 104/204/254/354.

The object deformation space onto which the n-dimensional mapping is performed is an n-dimensional space configured from n distinct primitive deformations. Such an object deformation space may be predetermined, for example, and may exist as an asset of contact-based deformation modeling software 120/220a/220b/320, or as an asset of deformation library 130/230a/230b/330. Alternatively, in some implementations, the object deformation space may be determined by contact-based deformation modeling software 120/220a/220b/320 dynamically, from primitive deformations stored in deformation library 130/230a/230b/330. Examples of such primitive deformations may include various types of surface fairing, surface blending with a pre-sculpted surface, and deformations based on offset curves.

Each dimension of the object deformation space may correspond to a primitive deformation stored in deformation library 130/230a/230b/330. The n-dimensional mapping of object data 144/244 may be seen as the decomposition of first object geometric data 144/244 and second object geometric data 146/246 into a collection of projections onto each of the n primitive deformations used to determine the n-dimensional object deformation space. Each data point included in first object geometric data 144/244 may be transformed by such a mapping. That mapping represents the influence of each of the n primitive deformations on the modeled deformation of the first virtual object at each surface point included in first object geometric data 144/244.

In implementations in which the first virtual object is in motion, first object geometric data 144/244 may be mapped to more than one object deformation space. For example, data corresponding to a front surface of the first virtual object relative to its direction of motion may be transformed by the n-dimensional mapping described above. In addition, however, data included in first object geometric data 144/244 and corresponding to a back surface of the first virtual object relative to its direction of motion may be transformed by an m-dimensional mapping onto a different m-dimensional object deformation space.

As described above for the n-dimensional object deformation space onto which data included in first object geometric data 144/244 and corresponding to a front surface of the first virtual object is mapped, each dimension of the m-dimensional object deformation space may also correspond to a primitive deformation stored in deformation library 130/230a/230b/330. The m-dimensional mapping of data included in first object geometric data 144/244 and corresponding to a back surface of the virtual object may be seen as the decomposition of that data into a collection of projections onto each of the m primitive deformations used to determine the m-dimensional object deformation space. Each data point included in first object geometric data 144/244 and corresponding to the back surface of the first virtual object may be transformed by such a mapping. That mapping represents the influence of each of the m primitive deformations on the modeled deformation of the first virtual object at each back surface point included in first object geometric data 144/244.

According to some implementations, system user 160 may participate in determination of the n-dimensional and/or m-dimensional mappings performed as part of the present method. For example, artist interface 110/210a/210b/310 may be configured to receive one or more inputs from system user 160 for determining the n-dimensional and/or m-dimensional mappings. In those implementations, object deformation software 120/220a/220b/320, executed by respective hardware processor 104/204/254/354, may use mapping module 122/222a/222b to perform the n-dimensional and/or m-dimensional mappings based on the one or more inputs.

Flowchart 400 can conclude with modeling the deformation of the first virtual object due to contact with the second virtual object, based on the n-dimensional mapping and a definition of direction for an object-to-object contact force between the first virtual object and the second virtual object so as to provide object deformation 126/226 (action 488). Modeling of the deformation of the first virtual object can be performed by contact-based deformation modeling software 120/220a/220b/320 of system 102/202/250/350, executed by respective hardware processor 104/204/254/354, using analysis module 124/224a/224b.

Analysis module 124/224a/224b may be configured to utilize the n-dimensional mapping of first object geometric data 144/244 and second object geometric data 146/246 onto the n-dimensional object deformation space, in addition to other variables, to provide object deformation 126/226. For example, in instances in which a collision between the first virtual object in the form of a soft object and the second virtual object in the form of a hard object occurs, the degree of penetration of the soft first virtual object by the hard second virtual object may contribute to object deformation 126/226.

In implementations in which the first virtual object is in motion, and the m-dimensional mapping described above may be performed in addition to the n-dimensional mapping, and the modeling of the deformation to provide object deformation 126/226 may be based on both the n-dimensional mapping and the m-dimensional mapping. Furthermore, in those instances, a blending factor may be identified and applied to the n-dimensional mapping, the definition of direction for the object-to-object contact force between the first virtual object and the second virtual object, and the m-dimensional mapping to avoid surface discontinuities in object deformation 126/226.

It is reiterated that, although the present exemplary method refers to a first virtual object and a second virtual object, in other implementations, the first virtual object may make contact or otherwise interact with more than one other virtual object. Thus any description herein referring to "a second virtual object" and "the second virtual object" is to be interpreted as referring more generally to "at least a second virtual object" and "the at least second virtual object."

Figure 5:
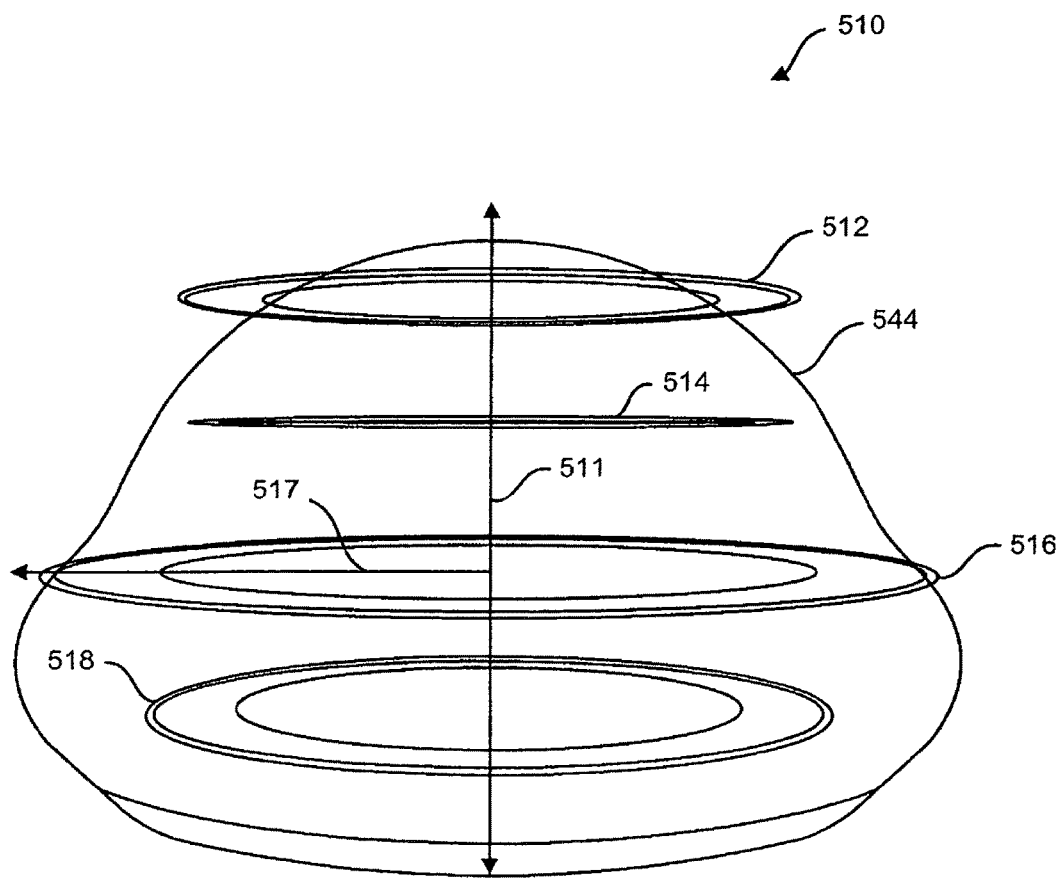
FIG. 5 shows an exemplary artist interface display including features for determining a mapping onto an object deformation space that may be modified based on inputs received from a user, according to one implementation.

Moving to FIG. 5, FIG. 5 shows exemplary artist interface display 510 including features for determining a mapping onto an object deformation space that may be modified based on inputs received from a user, according to one implementation. Artist interface display 510 shows object 544 of the first virtual object, for which deformation is being modeled. In addition, artist interface display 510 shows circles 512, 514, 516, and 518 stacked and spaced apart along axis 511 passing through a radial center of each of circles 512, 514, 516, and 518. Artist interface display 510 corresponds in general to artist interface 110/210a/210b/310, while object 544 corresponds in general to first object geometric data 144/244.

Artist interface display 510 is configured to receive an input from a user, such as system user 160, in FIG. 1, for determining the n-dimensional mapping of object 544. According to the exemplary implementation shown in FIG. 5, system user 160 may provide such an input by changing the position of one or more of circles 512, 514, 516, and 518 along axis 511. According to the present implementation, system user 160 may also, or may alternatively, provide such an input by changing, i.e., increasing or decreasing, a radius of one or more of circles 512, 514, 516, and 518, such as exemplary radius 517 of circle 516. Moreover, system user 160 may add additional circles to the stack including circles 512, 514, 516, and 518, or remove one or more of circles 512, 514, 516, and 518.

The inputs provided by system user 160 through artist interface 110/210a/210b/310 in response to artist interface display 510 can serve to determine the n-dimensional mapping of object 544. For instance, if one of the primitive deformations in the n-dimensional object deformation space is offset along the area of a collision of the first virtual object with a second virtual object, or along the normal direction to the surface of the first virtual object, circles 512, 514, 516, and 518 can be used to describe a mapping to the coordinates of the object deformation space that corresponds to this primitive deformation.

For example, points on the surface of the first virtual object above top circle 512 would not be deformed by the primitive deformation depicted in FIG. 5. That is to say, the coordinates corresponding to the primitive deformation shown in FIG. 5 for all points on the surface of the first virtual object that are above circle 512 would be zero. Thus, top circle 512 defines the height of the primitive deformation shown in FIG. 5. Below top circle 512, points on the surface of the first virtual object have low or high value coordinates for this primitive deformation based on their proximity to circles with respectively small or large radii. In order to ensure smooth results, a smooth interpolation function can be utilized to assign the influence of circles 512, 514, 516, and 518 to points on the surface of the first virtual object between the circles.

It is noted that the stack of circles 512, 514, 516, and 518 implies a lofted surface that goes through them and consequently allows system user 160 to readily understand the shape of the primitive deformation represented in FIG. 5. As a result, artist interface 110/210a/210b/310 enables system user 160 to control mapping to this primitive deformation in a very intuitive way.

Contact-based deformation modeling software 120/220a/220b/320 may change the appearance of object 544 on artist interface display 510 in real-time in response to inputs received from system user 160 through artist interface 110/210a/210b/310. As a result, system user 160 can be provided with real-time object deformation imagery corresponding to the input or inputs entered through artist interface 110/210a/210b/310. Such real-time response to the input(s) provided by system user 160 advantageously enables system user 160 to intuitively interact with artist interface 110/210a/210b/310 to produce desired object deformation 126/226.

Figure 6:
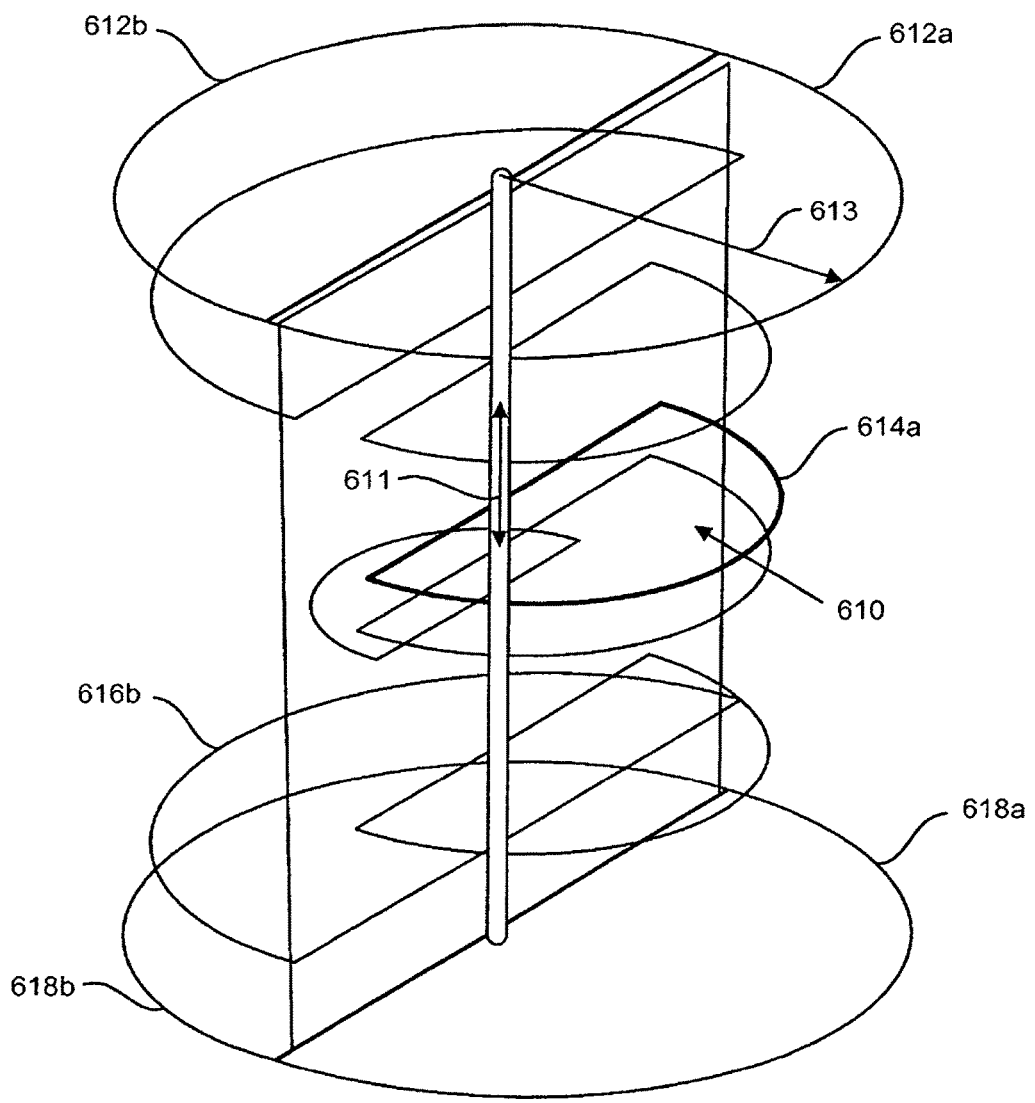
FIG. 6 shows an exemplary artist interface display including features for determining a mapping onto an object deformation space that may be modified based on inputs received from a user, according to another implementation.

Referring to FIG. 6, FIG. 6 shows exemplary artist interface display 610 including features for determining a mapping onto an object deformation space that may be modified based on inputs received from a user, according to another implementation. Artist interface display 610 shows half-circles 612a, 614a, and 618a stacked and spaced apart along axis 611 passing through a radial center of each of half-circles 612a, 614a, and 618a. Artist interface display 610 also shows half-circles 612b, 616b, and 618b stacked and spaced apart along the same axis 611 passing through a radial center of each of half-circles 612b, 616b, and 618b. Artist interface display 610 corresponds in general to artist interface display 510, as well as to artist interface 110/210a/210b/310.

The implementation shown in FIG. 6 may correspond to deformation modeling where the first virtual object is in motion. As noted above, in such instances, data corresponding to a front surface of the first virtual object with respect to the direction of motion may be transformed by an n-dimensional mapping onto an object deformation space, while data corresponding to a back surface may be transformed by an m-dimensional mapping onto another object deformation space. Half-circles 612a, 614a, and 618a may correspond to the front surface of the first virtual object, and half-circles 612b, 616b, and 618b may correspond to the back surface of the first virtual object.

Artist interface display 610 is configured to receive an input from a user, such as system user 160, in FIG. 1, for determining the n-dimensional mapping of the object geometric data and or the m-dimensional mapping. According to the exemplary implementation shown in FIG. 6, system user 160 may provide such an input by changing the position of one or more of half-circles 612a, 612b, 614a, 616b, 618a, and 618b on axis 611. According to the present implementation, system user 160 may also, or may alternatively, provide such an input by changing, i.e., increasing or decreasing, a radius of one or more of half-circles 612a, 612b, 614a, 616b, 618a, and 618b, such as exemplary radius 613 of half-circle 612a. Moreover, system user 160 may add additional half-circles to the stack including half-circles 612a, 612b, 614a, 616b, 618a, and 618b, or remove one or more of half-circles 612a, 612b, 614a, 616b, 618a, and 618b.

The inputs provided by system user 160 through artist interface 110/210a/210b/310 in response to artist interface display 610 can serve to determine the n-dimensional mapping and/or the m-dimensional mapping of the first virtual object, analogously to the manner described with reference to FIG. 5, above. In addition, adding half-circles to existing half-circles 612a, 614a, and 618a would increase the granularity with which system user 160 could modify the modeled deformation of the front surface of the first virtual object, while removing some of those half-circles would reduce the granularity of that model. Similarly, adding half-circles to existing half-circles 612b, 616b, and 618b would increase the granularity with which system user 160 could modify the modeled deformation of the back surface of the first virtual object, while removing some of those half-circles would reduce the granularity of control over that model.

It is noted that in some implementation, artist interface display 610 may include an object corresponding to object 544, in FIG. 5. In those implementations, contact-based deformation modeling software 120/220a/220b/320 may change the appearance of that object on artist interface display 610 in real-time in response to inputs received from system user 160 through artist interface 110/210a/210b/310. As a result, system user 160 can be provided with real-time object deformation imagery corresponding to the input or inputs entered through artist interface 110/210a/210b/310. Such real-time response to the input(s) provided by system user 160 advantageously enables system user 160 to intuitively interact with artist interface 110/210a/210b/310 to produce object deformation 126/226.

Thus, the systems and methods for object deformation modeling disclosed in the present application provide solutions enabling a user lacking expertise in computational mathematics, such as an artist, to model object deformations in an intuitive fashion, substantially in real-time.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computer-implemented deformation system comprising:
   a hardware processor and a system memory;
   a contact-based deformation modeling software stored in the system memory;
   wherein the hardware processor is configured to execute the contact-based deformation modeling software to:
     receive, via an artist interface of the computer-implemented deformation system, a first object geometric data corresponding to a first virtual object;
     receive, via the artist interface of the computer-implemented deformation system, a second object geometric data corresponding to at least a second virtual object;
     display, using the artist interface, at least one of a first plurality of circles and a second plurality of half-circles spaced apart along an axis passing through a radial center of each circle and half-circle;
     receive, via the artist interface of the computer-implemented deformation system, an input from a user of the computer-implemented deformation system to determine an n-dimensional mapping;
     transform, using a mapping module, the first object geometric data by the n-dimensional mapping onto an object deformation space determined based on n primitive deformations, where n is an integer larger than one;
     model, using an analysis module, a deformation of the first virtual object due to a contact with at least the second virtual object, based on the n-dimensional mapping and a definition of direction for an object-to-object contact force;
     deform the first virtual object according to the modeled deformation; and
     display the deformed first virtual object.

2. The computer-implemented deformation system of claim 1, wherein the hardware processor is further configured to execute the contact-based deformation modeling software to perform the n-dimensional mapping space based on the input.

3. The computer-implemented deformation system of claim 1, wherein the input from the user changes one or more of a position of at least one of the first plurality of circles along the axis and a position of the second plurality of half-circles along the axis.

4. The computer-implemented deformation system of claim 1, wherein the input from the user changes one or more of a radius of at least one of the first plurality of circles and a radius of at least one of the second plurality of half-circles.

5. The computer-implemented deformation system of claim 1, wherein the first virtual object is in motion and the first object geometric data corresponds to a front surface of the first virtual object with respect to a direction of motion of the first virtual object.

6. The computer-implemented deformation system of claim 5, wherein the hardware processor is further configured to execute the contact-based deformation modeling software to:
   receive another object geometric data corresponding to a back surface of the first virtual object with respect to the direction of motion of the first virtual object;
   transform the another object geometric data by an m-dimensional mapping onto another object deformation space determined based on m primitive deformations, where m is an integer larger than one; and
   model the deformation of the first virtual object due to the contact with at least the second virtual object, based on the n-dimensional mapping, the definition of direction for the object-to-object contact force, and the m-dimensional mapping.

7. A method for use by a computer-implemented deformation system including a hardware processor and a system memory having a contact-based deformation modeling software stored therein to model a deformation of a first virtual object due to a contact with at least a second virtual object, the method comprising:
   receiving a first object geometric data corresponding to the first virtual object;
   receiving a second object geometric data corresponding to at least the second virtual object;
   displaying, to the user, at least one of a first plurality of circles and a second plurality of half-circles spaced apart along an axis passing through a radial center of each circle and half-circle;
   receiving an input from a user of the computer-implemented deformation system for determining an n-dimensional mapping;
   transforming the first object geometric data by the n-dimensional mapping onto an object deformation space determined based on n primitive deformations, where n is an integer larger than one;
   modeling a deformation of the first virtual object due to the contact with at least the second virtual object, based on the n-dimensional mapping and a definition of direction for an object-to-object contact force;

deforming the first virtual object according to the modeled deformation; and displaying the deformed first virtual object.

8. The method of claim 7, further comprising performing the n-dimensional mapping based on the input.

9. The method of claim 7, wherein the input from the user changes one or more of a position of at least one of the first plurality of circles along the axis and a position of at least one of the second plurality of half-circles along the axis.

10. The method of claim 7, wherein the input from the user changes one or more of a radius of at least one of the first plurality of circles and a radius of at least one of the second plurality of half-circles.

11. The method of claim 7, wherein the first virtual object is in motion and the first object geometric data corresponds to a front surface of the first virtual object with respect to a direction of motion of the first virtual object.

12. The method of claim 11, further comprising:

receiving another object geometric data corresponding to a back surface of the first virtual object with respect to the direction of motion of the first virtual object;

transforming the another object geometric data by an m-dimensional mapping onto another object deformation space determined based on m primitive deformations, where m is an integer larger than one; and modeling the deformation of the first virtual object due to the contact with at least the second virtual object, based on the n-dimensional mapping, the definition of direction for the object-to-object contact force, and the m-dimensional mapping.

13. A computer-readable non-transitory medium having stored thereon instructions, which when executed by a hardware processor, instantiate a method comprising:

receiving a first object geometric data corresponding to a first virtual object;

receiving a second object geometric data corresponding to at least a second virtual object;

displaying, to the user, at least one of a first plurality of circles and a second plurality of half-circles spaced apart along an axis passing through a radial center of each circle and half-circle;

receiving an input from a user for determining an n-dimensional mapping;

transforming the first object geometric data by the n-dimensional mapping onto an object deformation space determined based on n primitive deformations, where n is an integer larger than one;

modeling a deformation of the first virtual object due to a contact with at least the second virtual object, based on the n-dimensional mapping and a definition of direction for an object-to-object contact force;

deforming the first virtual object according to the modeled deformation; and displaying the deformed first virtual object.

14. The computer-readable non-transitory medium of claim 13, wherein the first virtual object is in motion and the first object geometric data corresponds to a front surface of the first virtual object with respect to a direction of motion of the first virtual object.

15. The computer-readable non-transitory medium of claim 14, the method further comprising:

receiving another object geometric data corresponding to a back surface of the first virtual object with respect to the direction of motion of the first virtual object;

transforming the another object geometric data by an m-dimensional mapping onto another object deformation space determined based on m primitive deformations, where m is an integer larger than one; and modeling the deformation of the first virtual object due to the contact with at least the second virtual object, based on the n-dimensional mapping, the definition of direction for an object-to-object contact force, and the m-dimensional mapping.

* * * * *